United States Patent [19]
Lindenfors et al.

[11] 3,882,057
[45] May 6, 1975

[54] ADHESIVE COMPOSITION CONTAINING AS A BINDER A GRAFT POLYMER ON A WATER-SOLUBLE CELLULOSE ETHER OF AN UNSATURATED CARBOXYLIC ACID, ALKYL ACRYLATE AND VINYL ACETATE; AND PROCESS FOR PREPARING THE SAME

[75] Inventors: Sven Lindenfors, Domsjoverken; Nils Johan Lundberg, Ornskoldsvik, both of Sweden

[73] Assignee: Mo och Domsjo, Ornskoldsvik, Sweden

[22] Filed: Aug. 29, 1973

[21] Appl. No.: 392,835

[30] Foreign Application Priority Data
Sept. 14, 1972 Sweden.......................... 11878/72

[52] U.S. Cl............................................. 260/17 A
[51] Int. Cl............................................. C08b 21/32
[58] Field of Search......... 260/17 A, 17 R, 17.4 GC

[56] References Cited
UNITED STATES PATENTS
3,491,039  1/1970  Takahashi...................... 260/17 A OTHER PUBLICATIONS
Chem. Abst., Vol. 67, (1967), 44429j, Dunlop Rubber, "Stabilized Terpolymer Emulsions."

*Primary Examiner*—Melvin Goldstein
*Assistant Examiner*—Edward Woodberry

[57] ABSTRACT

An adhesive composition, is provided, containing as a binder a graft polymer on a water-soluble cellulose ether of a. an unsaturated carboxylic acid of the formula

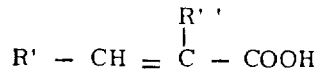

where R' and R'', independently of each other, are hydrogen or an alkyl group having 1–2 carbon atoms
  b. an alkyl acrylate having 1–8 carbon atoms in the alkyl portion, and
  c. vinyl acetate.

A process for preparing this graft polymer by reaction of these reagents with a water-soluble cellulose ether is also provided.

11 Claims, No Drawings

ADHESIVE COMPOSITION CONTAINING AS A BINDER A GRAFT POLYMER ON A WATER-SOLUBLE CELLULOSE ETHER OF AN UNSATURATED CARBOXYLIC ACID, ALKYL ACRYLATE AND VINYL ACETATE; AND PROCESS FOR PREPARING THE SAME

The present invention relates to an adhesive composition which as a binder contains a graft polymer. The adhesive composition is intended for use when sticking or bonding such materials as wood, paper, fabrics, plastic foil and different types of laminates.

Water containing cellulose ethers have long been used in adhesive compositions. These types of adhesives, which have been widely used as wall-paper "glues", for example, have, among other things, a relatively low degree of adhesion and cannot therefore fully satisfy the requirements of an adhesive for "gluing" wall coverings made of a material which is heavier than paper, for instance fabric and the like. Attempts have been made to improve the properties of the cellulose based adhesive, by introducing different polymerizable groups, for example, into the cellulose ethers or by mechanically admixing different polymers. Hitherto these efforts have not been particularly successful, however, and the need for an improvement in the properties of such adhesives remains.

It has now surprisingly been found that adhesive compositions which contain as a binder a special type of graft polymer based on water-soluble cellulose ethers have good application properties, a high degree of adhesion and a good initial "tack". The adhesive composition according to the invention is mainly characterized by the fact that the binder comprises a graft polymer of (a) an unsaturated carboxylic acid of the general formula

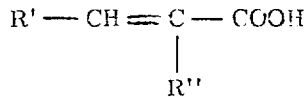

where R' and R'', independently of each other, are hydrogen or an alkyl group having 1–2 carbon atoms, (b) an alkyl acrylate having 1–8 carbon atoms in the alkyl portion, and (c) vinyl acetate, on a water soluble cellulose ether. Tests have shown that all three monomer groups are necessary in order for the adhesive composition to obtain satisfactory properties. Thus, the alkyl acrylate contributes primarily to an excellent initial tack, the vinyl acetate to good application properties, while the unsaturated carboxylic acid provides a high degree of adhesion. If a graft polymer is produced without the inclusion of one of the aforementioned monomer groups, a product is obtained which, in some respects, will not stand up to the requirements of a high-grade adhesive composition. Similarly a highly inferior product is obtained if the cellulose ether and the homopolymers and/or copolymers of the aforementioned monomer groups are mixed together mechanically. In addition to the advantages mentioned hereinbefore, the binder is also relatively matt and colourless, which is highly contributory to avoiding reflections and discolouration. Furthermore, the adhesive composition according to the invention can be worked very easily, which enables the same to be applied by means of rolling or spraying techniques, thereby making application of the adhesive relatively inexpensive.

The cellulose ether, which forms the basic matrix in the binder, shall be soluble in water. In general it has been found that anionic, cationic and nonionic cellulose ethers can be successfully used. Suitable ethers include, for instance, carboxymethyl cellulose, hydroxyethyl cellulose, hydroxyethyl hydroxypropyl cellulose, ethyl hydroxyethyl cellulose, methyl hydroxyethyl cellulose and methyl hydroxypropyl cellulose. Of these ethers, the ethyl hydroxyethyl cellulose is preferred. The substitution degree, DS and MS of the alkyl, hydroxyalkyl and carboxyl groups is not critical, but can be varied within wide limits, provided that the cellulose ether is soluble in water. Cellulose ethers which have a substitution degree such that the ether obtains a flocculation point of at least 25°C are preferred, however.

The quantity in which the different monomers are used can be varied within wide limits and is, among other things, dependent on the cellulose ether used, which specific monomers are incorporated in the component, and on the desired properties of the final adhesive composition. In general, however, the quantity in which the different monomers are added at the reaction stage should be from 0.2 to 5, preferably from 0.4 to 3 parts by weight of the unsaturated carboxylic acid; from 0.2 to 5, preferably from 0.4 to 3 parts by weight of the alkyl acrylate, and from 0.2 to 5, preferably from 0.4–3 parts by weight of the vinyl acetate, per part by weight cellulose ether. The alkyl acrylate used is preferably ethyl acrylate, although other alkyl acrylates, such as butyl acrylate and 2-ethylhexyl acrylate, have been found to produce compositions which possess good properties. Of the unsaturated carboxylic acids, methacrylic acid and acrylic acid are preferred.

The graft polymer of the present invention is produced by first activating the cellulose ether in a known manner and by then causing it to react with the three monomer groups, either individually or in mixture. The initiator may consist of, for example, ammonium persulphate, cerium sulphate or peroxide. Redox type initiators, such as ammonium persulphate/sodium pyrosulphite, are preferred, however, since this type of initiator provides better activation at low temperatures, enabling the reaction to be effected at temperature ranges of from 20°–80°C, preferably 30°–65°C. The reaction time is then from 30 minutes to 3 hours.

In addition to the binder, the adhesive composition of the present invention should also include conventional additives. An example of such is cellulose powder, which gives the adhesion surface a matt character and also serves as a filler. Other conventional ingredients are pH regulating agents, such as sodium bicarbonate, emulsifiers, for example of the nonionic and anionic type, buffers, such as sodium acetate — acetic acid, and additives for improving the freeze-thaw-stability and the durability of the composition during storage. The total quantity of the hereinbefore mentioned additives normally reaches to between 5 and 50% by weight of the binder. So that the rheological properties obtained by the adhesive composition are suitable for application purposes, its water content should be from 50–90%, preferably from 60–80% by weight of the total weight of the composition. The adhesive composition is suitably stored in a manner or form such as to obviate the use of additional additives.

If a redox initiator is used to activate the cellulose, binder compositions according to the invention can be produced by mixing the water-soluble cellulose ether in a reaction vessel in the presence of an inert gas, such as nitrogen, together with a filler, a pH regulator, emulsifier and water. Subsequent to heating the mix to approx. 30°–40°C, add the initiator, e.g. persulphate/sodium pyrosulphite, dissolved in a minor quantity of water, whereafter the whole mix is stirred until homogeneous. The monomers are then added, either separately or in mixture. 5–30% by weight of the quantity of monomers used are conveniently charged directly to the synthesis vessel to initiate the reaction. The remaining monomers are then added during 5–40 minutes. The form which the monomer charge takes depends primarily on the reaction temperature occurring in the reaction vessel. The temperature should not exceed 60°C during the initial stage of the reaction, but can be raised to 65°–80°C at the end thereof. The synthesis time from the moment of adding the monomers is normally between 30 minutes and 3 hours. When producing the graft polymer, there is obtained additional to the graft polymer itself minor quantities of homo- and copolymers between the monomers, which also become incorporated in the final adhesive composition. The quantity of monomers polymerizing to homo- or copolymers is estimated to be 5–30% calculated on the total monomer quantity. As might be understood, it is not possible to exclude the fact that the cellulose powder used as a filler may be slightly activated and may react with the polymerizable monomers. If such substitution does take place, however, it has no appreciable affect on the properties of the composition.

The adhesive composition according to the invention can be used to bond a large number of different materials, such as wood, paper, different types of textiles, leather, rubber, plastics, and metals, together with different aggregations and laminates of these materials. The adhesive composition is primarily intended for gluing different types of wall coverings in dry surroundings to supporting surfaces, for example such wall coverings as wallpaper, wall-fabric etc. Other conventional uses to which the composition can be put include the bonding of paper to form, for instance, paper bags; plastic foil; regenerated cellulose or different combinations of these materials.

The present invention will now be further illustrated in the following examples:

EXAMPLE 1

To a glass synthesis vessel there were charged under a nitrogen atmosphere 42 gr of ethyl hydroxyethyl cellulose having a viscosity of 300 cP determined in a 2% aqueous solution at 20°C according to Brookfield, 21 gr of cellulose powder, 3 gr of sodium bicarbonate, 20 gr of an emulsifier comprising mainly addition products between nonylphenol and ethylene oxide, and 760 gr of water. The total charge was stirred for 5 minutes until a homogeneous mix was obtained, whereafter the mix was allowed to stand until all cellulose ethers had dissolved. The mix was then heated to 35°C and an initiator system consisting of 1.13 gr of ammonium persulphate and 0.90 gr of sodium pyrosulphite dissolved in a small amount of water was added. Subsequent to agitating the mix until the initiator system was homogeneously dispersed, there was successively added a monomer mixture consisting of 60 gr of vinyl acetate, 67.4 gr of ethyl acrylate and 21 gr of acrylic acid over 25 minutes. The reaction temperature was maintained at about 55°C and the reaction time was 2 hrs. A buffer system consisting of 5.0 gr of sodium acetate and 2.6 gr of acetic acid was added at the end of the reaction time. To enable comparisons to be made, other compositions were prepared which did not contain one of the monomers vinyl acetate, ethyl acrylate and acrylic acid. With the comparison compositions, the following ingredients were used.

Adhesive composition not containing vinyl acetate.
52.5 gr of ethyl hydroxyethyl cellulose
7.5 gr of sodium bicarbonate
20.0 gr of emulsifier
1.13 gr of ammonium persulphate
0.9 gr of sodium pyrosulphite
60.0 gr of ethyl acrylate
90.0 gr of acrylic acid
5.0 gr of sodium acetate
2.6 gr of acetic acid
740.0 gr of water Adhesive composition not containing ethyl acrylate.
75.0 gr of ethyl hydroxyethyl cellulose
15.0 gr of cellulose powder
3.0 gr of sodium bicarbonate
20.0 gr of emulsifier
2.25 gr of ammonium persulphate
1.8 gr of sodium pyrosulphite
75.0 gr of vinyl acetate
75.0 gr of acrylic acid
5.0 gr of sodium acetate
2.6 gr of acetic acid
580.0 gr of water Adhesive composition not containing acrylic acid.
52.5 gr of ethyl hydroxyethyl cellulose
21.0 gr of cellulose powder
2.0 gr of sodium bicarbonate
20.0 gr of emulsifier
1.13 gr of ammonium persulphate
0.90 gr of sodium pyrosulphite
75.0 gr of vinyl acetate
75.0 gr of ethyl acrylate
5.0 gr of sodium acetate
2.6 gr of acetic acid
740.0 gr of water The adhesive compositions obtained were tested for adhesion, both with and without pregluing, application properties, initial tack and consistency.

The adhesion was determined by gluing a 10 cm wide gauze strip to a fibre plate substrate. The adhesive was applied to a thickness of 200 µm. The load, expressed in grams, required to remove the gauze strip from the substrate gave the adhesion. The greater the load required, the greater the adhesion. The term "pregluing" as used here implies that the fibre plate was first coated with adhesive, which was allowed to dry, and then furnished with a further quantity of adhesive before the gauze strip was applied and the degree of adhesion determined.

The initial tack was determined by applying a film of adhesive 700 µm thick to a fibre plate. After 30 seconds a tack plate having a tight jute weave 5 cm × 5 cm in dimensions was lowered against the adhesive film and allowed to lie for 10 seconds with its own weight of 264 gr as the load acting thereon. The surface of the adhesive was then subjected to a tensile load of 364 gr. The time taken to break the adhesion was noted. The adhesions which held for a period of 2 minutes were loaded with a further 100 gr and the time taken to break the adhesion at this higher load was noted.

Tests carried out on the adhesive compositions gave the following results.

| Craft polymer monomers | Adhesion without gram/10 cm | Pregluing with gram/10 cm | Initial "tack" | Application properties | Consistency |
| --- | --- | --- | --- | --- | --- |
| vinyl acetate ethyl acrylate acryl acid | 2800 | 3200 | 2 min. + 12 sec. | good | medium stiff |
| ethyl acrylate acrylic acid | 3200 | 3200 | 2 min. + 15 sec. | poor | stiff tough |
| vinyl acetate ethyl acrylate | 1400 | 2300 | 1 min. 50 sec. | good | medium stiff |
| vinyl acetate acryl acid | 3500 | 4300 | 54 sec. | fairly good | medium stiff |

As will be evident from the results, the adhesive composition according to the invention gave good results throughout with regard to adhesion, initial tack, application properties and consistency. On the other hand the results obtained with the compositions based on only two of the three monomer groups were unsatisfactory. Thus, the absence of ethyl acrylate from the composition resulted in a much poorer initial tack, while the absence of acrylic acid gave poorer adhesion and a relatively poor initial tack. The absence of vinyl acetate greatly impaired the application properties and the adhesive obtained a stiff and tough consistency, which made it impossible to apply the adhesive by roller.

EXAMPLE 2

In the same manner as that in Example 1, there was produced an adhesive composition based on carboxymethyl cellulose having a viscosity of 330 cP in a 2% aqueous solution at 20°C, vinyl acetate, ethyl acrylate and acrylic acid. The following ingredients were included.

35.0 gr of carboxymethyl cellulose
28.5 gr of cellulose powder
4.0 gr of sodium bicarbonate
20.0 gr of emulsifier
1.13 gr of ammonium persulphate
0.90 gr of sodium pyrosulphite
40.0 gr of vinyl acetate
60.0 gr of ethyl acrylate
30.0 gr of acrylic acid
5.0 gr of sodium acetate
2.6 gr of acetic acid
740.0 gr of water The adhesive composition obtained was tested with respect to adhesion, initial tack and application properties and was found to meet splendidly the requirements placed on an adhesive composition in said respects. The following results were obtained.

| Adhesion not | preglued | 2400 gr/10 cm |
| | preglued | 2900 gr/10 cm |
| Initial "tack" | | 2 mins. + 7 secs. |
| Application properties | | good |
| Consistency | | somewhat thin |

EXAMPLE 3

In a manner corresponding to that of Example 1 there was produced an adhesive composition based on hydroxyethyl cellulose having a viscosity of about 400 cP in a 2% aqueous solution at 20°C, vinyl acetate, ethyl acrylate and acrylic acid. The following ingredients were added during the process of manufacture.

350 gr of hydroxyethyl cellulose
28.5 gr of cellulose powder
4.0 gr of sodium bicarbonate
20.0 gr of emulsifier
1.13 gr of ammonium persulphate
0.90 gr of sodium pyrosulphite
40.0 gr of vinyl acetate
70.0 gr of ethyl acrylate
20.0 gr of acrylic acid
5.0 gr of sodium acetate
2.6 gr of acetic acid
740.0 gr of water The adhesive composition obtained was tested with regard to adhesion, initial tack and application properties and was found to meet splendidly the requirements placed on an adhesive in the said respects. The following results were obtained.

| Adhesion, not | preglued | 2500 gr/10 cm |
| | preglued | 3700 gr/10 cm |
| Initial "tack" | | 2 mins. + 4 sec. |
| Application properties | | good |
| Consistency | | somewhat thin |

EXAMPLE 4

In a manner corresponding to that of Example 1 there was produced an adhesive composition based on ethyl hydroxyethyl cellulose having a viscosity of about 3000 cP in a 2% aqueous solution at 20°C. The monomers which consisted of vinyl acetate, ethyl acrylate and acrylic acid, were added in slightly different quantities to those in Example 1. The following ingredients were included in the adhesive composition.

35 gr of ethyl hydroxyethyl cellulose
28.5 gr of cellulose powder
4.0 gr of sodium bicarbonate
20.0 gr of emulsifier
1.13 gr of ammonium persulphate
0.90 gr of sodium pyrosulphite
42.0 gr of vinyl acetate
60.0 gr of ethyl acrylate
30.0 gr of acrylic acid
5.0 gr of sodium acetate
2.6 gr of acetic acid
740.0 gr of water The adhesive composition obtained was tested with regard to adhesion, initial tack, application properties and consistency and was found to have properties equivalent to those of the composition obtained in Example 1. This shows that the composition of the graft polymers can be varied within relatively wide limits without losing their good performance. The following results were obtained.

| Adhesion, not | preglued | 2700 gram/10 cm |
| | preglued | 2900 gram/10 cm |
| Initial "tack" | | 2 mins. + 8 sec. |
| Application properties | | good |
| Consistency | | medium stiff |

EXAMPLE 5

In the same manner as with Example 1 there was produced an adhesive composition based on ethyl hydroxyethyl cellulose having a viscosity of about 300 cP in a 2% aqueous solution at 20°C and vinyl acetate, ethyl acrylate and methacrylic acid as polymerizable monomers. The following ingredients were included.

45.0 gr of ethyl hydroxyethyl cellulose
21.9 gr of cellulose powder
3.0 gr of sodium bicarbonate
20.0 gr of emulsifier
1.13 gr of ammonium persulphate
0.90 gr of sodium pyrosulphite
60.0 gr of vinyl acetate
60.0 gr of ethyl acrylate
25.0 gr of methacrylic acid
716.0 gr of water The adhesive composition obtained was tested with respect to adhesion, initial tack and application properties. The following results were obtained.

| Adhesion, not | preglued | 2400 gr/10 cm |
| | preglued | 3200 gr/10 cm |
| Initial "tack" | | 2 mins. + 4 sec. |
| Application properties | | fairly good |
| Consistency | | medium stiff |

The substitution of methacrylic acid for the acrylic acid used in Example 1 did not greatly affect the qualities of the composition, but that the good properties obtained with the composition produced in accordance with Example 1 were retained.

EXAMPLE 6

In the same manner as that with Example 1, there was produced an adhesive composition in which the polymerizable monomers comprised vinyl acetate, 2-ethylhexyl acrylate and methacrylic acid. The following ingredients were included.

45.0 gr of ethyl hydroxyethyl cellulose
21.9 gr of cellulose powder
3.0 gr of sodium bicarbonate
20.0 gr of emulsifier
1.13 gr of ammonium persulphate
0.90 gr of sodium pyrosulphite
60.0 gr of vinyl acetate
60.0 gr of 2-ethylhexyl acrylate
25.0 gr of methacrylic acid
7.6 gr of water The adhesive composition obtained was tested with respect to adhesion, initial tack and application properties. The following results were obtained.

| Adhesion, not | preglued | 2050 gr/10 cm |
| | preglued | 2700 gr/10 cm |
| Initial "tack" | | 2 mins. + 40 sec. |
| Application properties | | good |
| Consistency | | medium stiff |

This composition, in which the acrylate was 2-ethylhexylacrylate, also had good properties throughout. The initial tack was noticeably good, while although the adhesion was slightly poorer it was nevertheless satisfactory.

In the Specification and Claims, all parts are by weight.

We claim:

1. An adhesive composition comprising as a binder a graft polymer of
   a. an unsaturated carboxylic acid having the formula

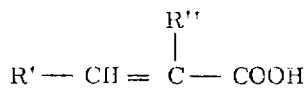

where R' and R'' independently of each other are selected from the group consisting of hydrogen and alkyl groups having from one to two carbon atoms;
   b. an alkyl acrylate having from one to eight carbon atoms in the alkyl; and
   c. vinyl acetate;

graft polymerized on a graft polymer backbone of a water-soluble ether; the amount of unsaturated carboxylic acid being within the range from about 0.2 to 5 parts per part of cellulose ether; the amount of alkyl acrylate being within the range from about 0.2 to 5 parts per part of cellulose ether; and the amount of vinyl acetate being within the range from 0.2 to 5 parts per part of cellulose ether.

2. An adhesive composition according to claim 1 in which the amounts of unsaturated carboxylic acid, alkyl acrylate and vinyl acetate are each within the range from about 0.4 to about 3 parts per part of cellulose ether.

3. An adhesive composition according to claim 1 in which the water-soluble cellulose ether is a nonionic cellulose ether.

4. An adhesive composition according to claim 3 in which the nonionic cellulose ether is selected from the group consisting of ethyl hydroxyethyl cellulose and hydroxyethyl cellulose.

5. An adhesive composition according to claim 1 in which the water-soluble cellulose ether is an anionic cellulose ether.

6. An adhesive composition according to claim 5 in which the anionic cellulose either is carboxymethyl cellulose.

7. An adhesive composition according to claim 1 comprising in addition a filler, a pH regulator system, a buffer and an emulsifier.

8. A method of producing a binder for use in an adhesive composition which comprises activating a water-soluble cellulose ether by mixing the cellulose ether with a redox initiator system, and causing the activated cellulose ether to react with a. an amount within the range from 0.2 to 5 parts per part of cellulose ether of an unsaturated carboxylic acid having the formula

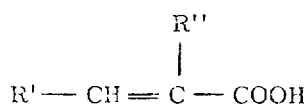

where R' and R'' independently of each other are selected from the group consisting of hydrogen and alkyl groups having from one to about two carbon atoms;
  b. an amount within the range from 0.2 to 5 parts per part of cellulose ether of an alkyl acrylate having from one to eight carbon atoms in the alkyl; and
  c. an amount within the range from 0.2 to 5 parts per part of cellulose ether of vinyl acetate.

9. A method according to claim 8, characterized in that the redox initiator comprises ammonium persulphate/sodium pyrosulphite.

10. An adhesive composition according to claim 1 comprising, in addition to the binder, an amount within the range from about 5 to about 50% by weight of the binder of adhesive composition ingredients selected from the group consisting of fillers, pH regulating agents, emulsifiers, buffers, and additives for improving freeze-thaw stability and stability upon storage; and an amount of water within the range from about 50 to about 90% by weight of composition.

11. An adhesive composition according to claim 10 comprising cellulose powder as the filler; sodium bicarbonate as the pH regulating agent; and sodium acetate and acetic acid as the buffer.

* * * * *